(12) United States Patent
Usuba et al.

(10) Patent No.: US 7,706,354 B2
(45) Date of Patent: Apr. 27, 2010

(54) TELEPHONE SWITCHING SYSTEM ACCOMMODATING A PLURALITY OF LINE PACKAGES

(75) Inventors: Shinji Usuba, Tokyo (JP); Hiroshi Kuboki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1500 days.

(21) Appl. No.: 10/988,550

(22) Filed: Nov. 16, 2004

(65) Prior Publication Data
US 2005/0105514 A1    May 19, 2005

(30) Foreign Application Priority Data
Nov. 17, 2003    (JP)    ............................. 2003-386949

(51) Int. Cl.
H04L 12/66    (2006.01)
(52) U.S. Cl. .................... 370/352; 367/81; 370/338; 370/356; 370/466; 379/265.06; 709/201; 709/227; 709/247; 714/758
(58) Field of Classification Search ................ 370/352, 370/356, 338, 466; 367/81; 709/201, 227, 709/247; 379/265.06; 714/758
See application file for complete search history.

(56) References Cited

U.S. PATENT DOCUMENTS

| | | | | |
|---|---|---|---|---|
| 5,067,114 | A * | 11/1991 | Rorden ......................... | 367/81 |
| 6,292,840 | B1 * | 9/2001 | Blomfield-Brown et al. ...... | 709/247 |
| 6,445,697 | B1 * | 9/2002 | Fenton ......................... | 370/357 |
| 6,556,587 | B1 * | 4/2003 | Svanbro et al. ............. | 370/471 |
| 6,603,774 | B1 * | 8/2003 | Knappe et al. .............. | 370/466 |
| 6,621,893 | B2 * | 9/2003 | Elzur ....................... | 379/93.05 |
| 6,633,582 | B1 * | 10/2003 | Panburana et al. .......... | 370/465 |
| 6,856,612 | B1 * | 2/2005 | Bjelland et al. ............. | 370/338 |
| 7,023,839 | B1 * | 4/2006 | Shaffer et al. ................ | 370/356 |
| 7,039,043 | B2 * | 5/2006 | Sugihashi et al. ........... | 370/355 |
| 7,039,059 | B2 * | 5/2006 | Mizusawa et al. ........... | 370/401 |
| 7,307,980 | B1 * | 12/2007 | Shah .......................... | 370/352 |
| 7,336,630 | B2 * | 2/2008 | Hamalainen et al. ........ | 370/329 |
| 2001/0008556 | A1 * | 7/2001 | Bauer et al. ............ | 379/265.06 |

(Continued)

OTHER PUBLICATIONS

"Pulse code modulation (PCM) of voice frequencies", Geneva, 1972, Further amended, ITU-T (International Telecommunication Union-Telecommunication Standardization Sector) Recommendation G. 711.

(Continued)

Primary Examiner—Gerald Gauthier
(74) Attorney, Agent, or Firm—Rabin & Berdo, P.C.

(57) ABSTRACT

A telephone switching system includes line packages and a switch unit allowing a path to be established between the line packages. At least one line package is interconnected to, e.g. a broadband-adaptive unit, and is adaptive to both of a first coding rule expected of the switch unit and a second coding rule higher in compression ratio than the first coding rule. The broadband-adaptive line package, monitoring the coding rule of another line package connected thereto, adapts itself to the first coding rule if the other line package is adaptive only to the first coding rule, or adapts itself to the second coding rule if the other line package is adaptive to both of the first and second coding rules.

7 Claims, 3 Drawing Sheets

U.S. PATENT DOCUMENTS

| | | | |
|---|---|---|---|
| 2002/0099548 A1* | 7/2002 | Manjunath et al. | 704/266 |
| 2003/0037095 A1* | 2/2003 | Sharma | 709/201 |
| 2003/0091034 A1* | 5/2003 | Koistinen | 370/352 |
| 2003/0204599 A1* | 10/2003 | Trossen et al. | 709/227 |
| 2008/0005642 A1* | 1/2008 | Kikuchi et al. | 714/758 |

OTHER PUBLICATIONS

"7 kHz Audio-coding within 64 kbit/s", Melbourne, 1988, ITU-T (International Telecommunication Union-Telecommunication Standardization Sector) Recommendation G. 712.

* cited by examiner

TELEPHONE SWITCHING SYSTEM ACCOMMODATING A PLURALITY OF LINE PACKAGES

BACKGROUND OF THE INVENTION

1. Field of the Invention

The present invention relates to a telephone switching system, and more particularly to a telephone switching system applicable to a PBX (Private Branch exchange) accommodating, e.g. units adaptive to an existing communications network such as a public switched telephone network and a broadband network.

2. Description of the Background Art

Today, the rapid growth of broadband communications has not only made transmission equipment on the network side adaptive to broadband services, but also promoted the replacement of ordinary subscriber lines with broadband circuits such as ADSL (Asymmetric Digital Subscriber Line) or optical fibers. In parallel with such spread of broadband networks, or broadband IP (Internet Protocol) networks, broadband CODECs (COder-DECoders) are used so that communications units and terminals such as IP telephone sets are spreading for thereby enhancing communications quality.

A conventional switching network has, in many cases, a particular kind of CODEC. In other words, a particular coding rule is assigned to each interface. Such a switching network was therefore, in this sense, problematic little. However, considering the current trend toward the mixture of a conventional network such as a public switched telephone network with a modern broadband network, it is necessary to select a particular kind of CODEC for each call. For example, a conventional circuit switching system or a conventional PBX uses a coding rule that basically accords to ITU-T (International Telecommunication Union-Telecommunication standardization sector) Recommendation G.711 (G.711 coding rule hereinafter). However, when the circuit switching system or the PBX accommodates a broadband interface according to ITU-T Recommendation G.722 (G.722 coding rule hereinafter), it is necessary to match its CODEC to the other station to be connected. More specifically, communications must be held in a G.722 or broadband mode if the other station connected is a broadband station using the G.722 coding rule, or be in a G.711 mode if it accords to the G.711 coding rule.

Now, the frequency band available with a broadband IP network is basically not limited, and therefore promotes services using broadband audio signals. More specifically, human voices are originally not limited to the frequency band below 4 kHz inclusive, but include harmonics components, so that broadband communications are more desirable in establishing conversation that sounds more natural or less wearing.

IP telephone systems, for example, can implement broadband communications. More specifically, when the G.722 coding rule is used in combination with, e.g. H.323, MGCP (Media Gateway Control Protocol), SIP (Session Initiation Protocol) or similar protocol standardized by the ITU-T, the frequency band for communications can be broadened if CODEC negotiation is executed. However, the following problem would arise when an IP telephone set is accommodated in a conventional PBX based on a time switch.

Generally, the coding rule of a conventional PBX is fixed to the G.711 or similar coding rule not adaptive to broadband applications. If an IP telephone set adaptive to broadband communications is accommodated in such a PBX, then the IP telephone set must be designed to negotiate a coding rule with a central control module included in the PBX for controlling call switching processing. However, it would be impractical for the central control module, which inherently bears a heavy load, to perform negotiation on the coding rule as well.

SUMMARY OF THE INVENTION

It is an object of the present invention to provide a telephone switching system capable of easily adapting even to a sort of line that accords to a coding rule other than one expected of the telephone switching system.

A telephone switching system of the present invention includes a plurality of line packages and a switch unit allowing a path to be established between ones of the plurality of line packages. At least one of the line packages is a broadband-adaptive line package interconnected to a broadband network or a broadband-adaptive unit, and is adaptive to both of a first coding rule expected of the switch unit with respect to input data and a second coding rule higher in compression ratio than the first coding rule. At least the broadband-adaptive line package includes a setting circuit configured to monitor the coding rule of another line package connected thereto via the switch unit on the basis of information received via the switch unit. The setting circuit adapts itself to the first coding rule if the other line package is adaptive only to the first coding rule, or adapts itself to the second coding rule if the other line package is adaptive to both of the first and second coding rules.

With the above configuration, the telephone switching system of the present invention can easily adapt not only to the first coding rule but also to the second coding rule higher in compression ratio than the first coding rule.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
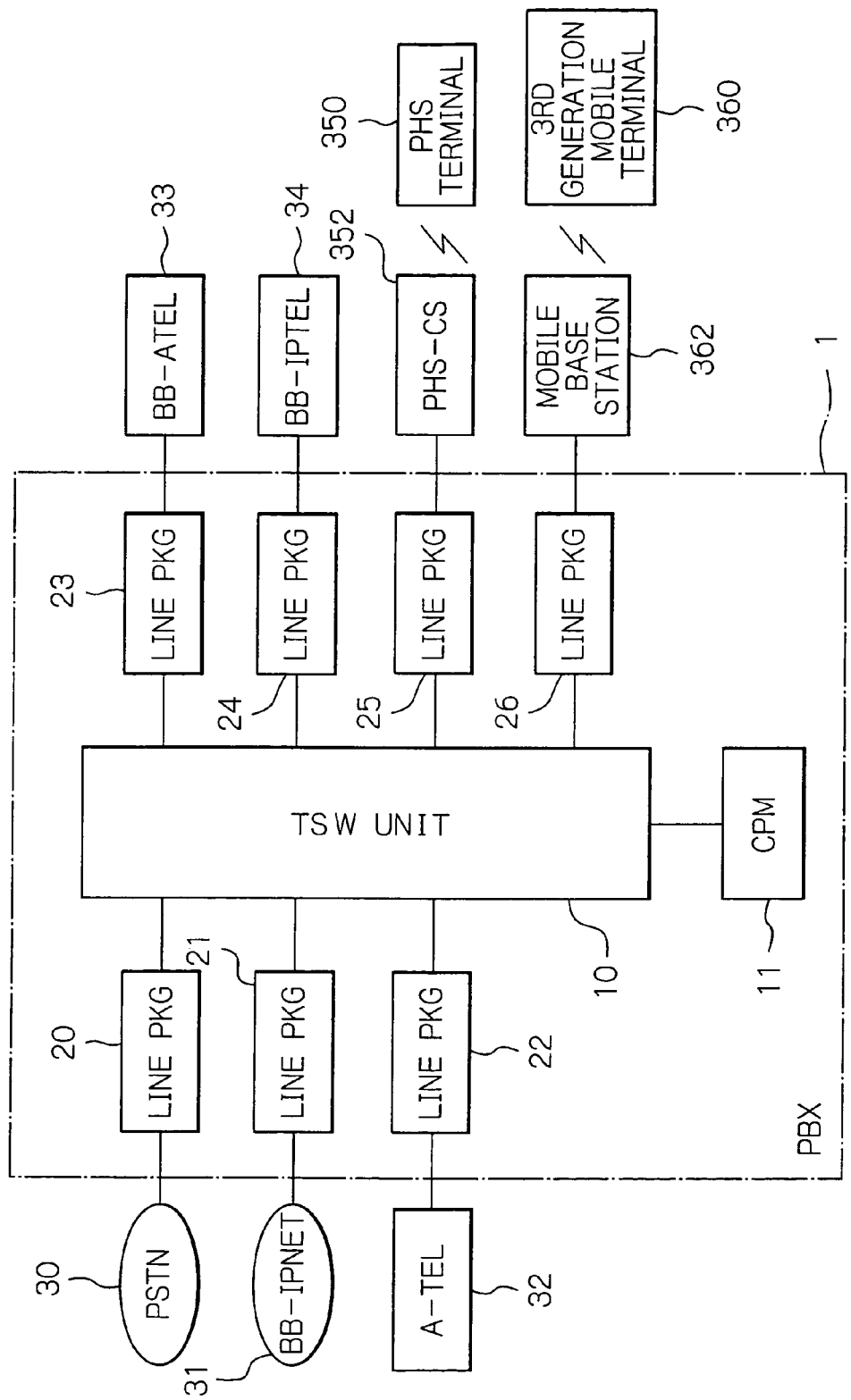
FIG. 1 is a schematic block diagram showing a preferred embodiment of a telephone switching system in accordance with the present invention and implemented in the form of PBX by way of example.

Referring now to FIG. 1 of the accompanying drawings, a telephone switching system embodying the present invention is implemented in the form of PBX by way of example. As shown, the PBX, generally 1, includes a time switch (TSW) unit 10 which is primarily comprised of time switches. The PBX 1 has a central processor module (CPM) 11 adapted to control path selection to be established through the time switch unit 10 while executing other various kinds of control including call control. The time switch unit 10 has a plurality of line packages, or line accommodating units, 20 through 26 interconnected for terminating, or establishing an interface with, lines or circuits. In the illustrative embodiment, the line packages 20 and 21 are interconnected to central office and outside lines while the line packages 22 through 26 have the appearances of extension lines in a costumer's premises. Although line and trunk packages are included in the PBX 1 which are adapted for various kinds of trunks such an audible tone trunk, they are not shown in FIG. 1 merely for simplicity.

More specifically, the line package 20 has the appearance of lines coming from an analog PSTN (Public Switched Telephone Network) 30 while the other line package 22 has the appearance of an extension line connected to a conventional analog-telephone (A-TEL) set 32. The time switch unit 10 establishes a particular path for each call under the control of the central processor module 11.

The line packages 20 and 22, time switch unit 10 and central processor module 11 may be conventional and configured in accordance with, e.g. the G.711 coding rule. The line package 23 may be the same as the line packages 20 and 22 except that it has the function of negotiating different coding rules, as will be described in detail hereinafter.

Figure 2:
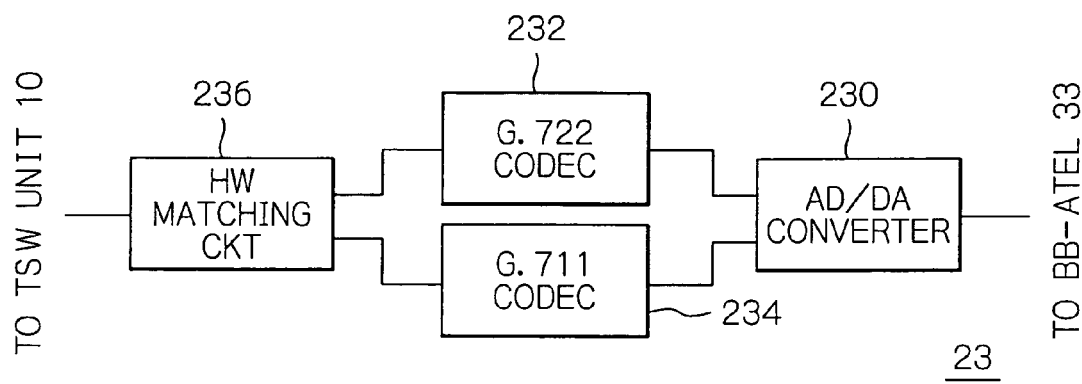
FIG. 2 is a schematic block diagram showing a specific configuration of a line package included in the illustrative embodiment and accommodating a broadband analog telephone set.

The line package 23 has the appearance of another extension line connected to a broadband analog telephone set (BB-A TEL) 33. FIG. 2 shows a specific configuration of the line package 23. As shown, in the aspect of speech signal processing, the line package 23 includes an AD (Analog-to-Digital)/DA (Digital-to-Analog) converter 230, a G.722 CODEC 232, a G.711 CODEC 234, and an HW (HighWay) matching circuit 236. The line package 23 additionally includes other various circuits such as systems for processing signaling and identifying destination numbers, although not specifically shown in FIG. 2.

The AD/DA converter 230 is adapted to selectively convert an analog speech signal input from the broadband analog telephone set 33 to a corresponding digital signal, or a digital speech signal input from the G.722 CODEC 232 or the G.711 CODEC 234 to a corresponding analog signal. The digital signal or the analog signal thus developed by the AD/DA converter 230 is input to either one of the G.722 CODEC 232 and G.711 CODEC 234 or the broadband analog telephone set 33, respectively.

More specifically, the G.722 CODEC 232 is adapted to selectively code and decode a speech signal in accordance with the coding rule G.722, which may be any one of a 48-kbps (kilobits per second) mode, a 56-kbps mode and a 64-kbps mode. In any case, when a call is originated on the broadband analog telephone set 33, the operation of the CODEC 232 accords to the mode setting switch, not shown, of the telephone set 33. The other CODEC, the G.711 CODEC, 234 is adapted to selectively code and decode a speech signal in accordance with the coding rule G.711.

The HW matching circuit 236 is adapted to selectively insert data in a HW slot input to the time switch unit 10 or remove data from a HW slot output from the time switch unit 10.

Further, the HW matching circuit 236 is capable of negotiating a coding rule with the other line package connected to the line package 23. More specifically, at the time of negotiation, the HW matching circuit 236 sends out data, or highway slot data, according to the G722 coding rule to the other line package to be connected. Subsequently, by monitoring a coding rule pattern included in a signal received from the other line package, the HW matching circuit 236 determines whether or not the other line package is adaptive to the G.722 coding rule. If the other line package is not adaptive to the G.722 coding rule, i.e. it is adaptive only to the G.711 coding rule, the HW matching circuit 236 enables the G.711 CODEC 234 and adapts the AD/DA converter 230 to the G.711 CODEC 234. On the other hand, if the other line package is adaptive to the G.722 coding rule, the HW matching circuit 236 enables the G.722 CODEC 232 and adapts the AD/DA converter 230 to the G.722 CODEC 232 while inserting speech data based on the G.722 coding rule in the HW slot.

The HW matching circuit 236 informs the other line package connected to the line package 23 of the fact that it is adaptive to the G.722 coding rule with the following scheme. If the HW matching circuit 236 accords to the 48-kbps mode or the 56-kbps mode of the G.722 coding rule, then a sixteen or an eight kilobits per second of idle band is available. In this case, the HW matching circuit 236 inserts into that idle band information indicative of the 48-kbps or the 56-kbps broadband mode, and sends it out to the other line package. On the other hand, when the HW matching circuit 236 accords to the 64-kbps mode of the G.722 coding rule, and therefore an idle band is not available, the HW matching circuit 236 periodically steals the lowest bit of a highway slot or that of a frame and inserts information indicative of the 64-kbps broadband mode into the position of the lowest bit. If desired, the above information to be inserted in the lowest bit position may be formed in a multi-frame pattern.

Referring again to FIG. 1, the line package 21 is interconnected to a broadband IP network (BB-IPNET) 31 by a subscriber line. The line package 24 is interconnected to a broadband IP telephone set (BB-IPTEL) 34 by an extension line. The line package 26 is interconnected to a mobile telephone base station 362 that is, in turn, connectable to a third-generation mobile terminal 360 via air interface.

Figure 3:
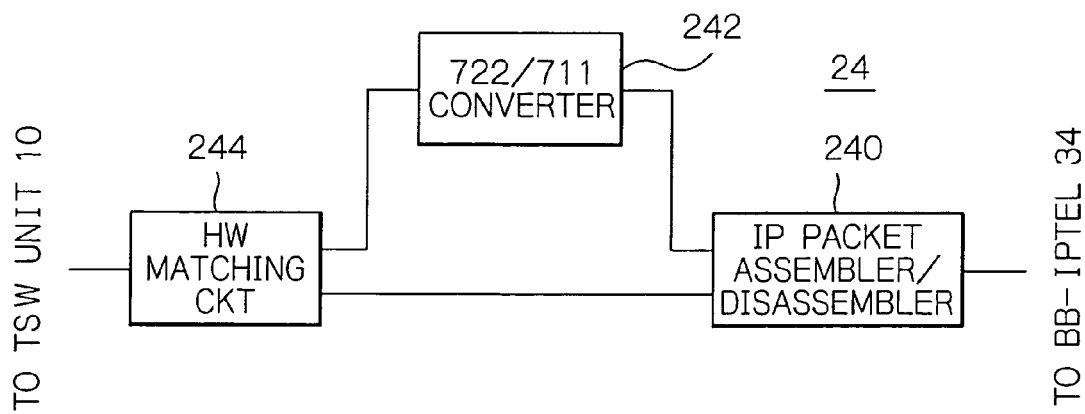
FIG. 3 is a schematic block diagram showing a specific configuration of another line package also included in the illustrative embodiment but accommodating a broadband IP telephone set.

FIG. 3 shows a specific configuration of the line package 24. As shown, the line package 24 is generally made up of an IP packet assembler/disassembler 240, a 722/711 converter 242, and a HW matching circuit 244. The line packages 21 and 26, FIG. 1, may have substantially the same configuration as the line package 24. If desired, the broadband IP telephone set 34 may be interconnected to, e.g. a personal computer and adapted for converting data input thereon to an IP packet and sending out the latter.

The IP packet assembler/disassembler 240 is adapted to selectively disassemble IP packets received from the broadband IP telephone set 34 or assemble IP packets to be sent to the broadband IP telephone set 34. It is to be noted that speech data relating to IP packets accords to the G.722 coding rule.

The 722/711 converter 242 is adapted to convert signals between the G.722 and G.711 coding rules. Specifically, it converts data between 64-kpbs (7 kHz) audio coding and 64-kbps PCM (Pulse Code Modulation) coding. This kind of conversion scheme is also described in ITU-T Recommendation G.722.

The HW matching circuit 244 operates in the same manner as the HW matching circuit 236 shown in FIG. 2. More specifically, the HW matching circuit 244 determines whether or not the mating or other line package connected to the line package 24 is adaptive to the G.722 coding rule. If the other line package is not adaptive to the G.722 coding rule, i.e. it is adaptive only to the G.711 coding rule, then the HW matching circuit 244 enables the 722/711 converter 242 so as to adapt the other line package to the G.711 coding rule on the highway.

Figure 4:
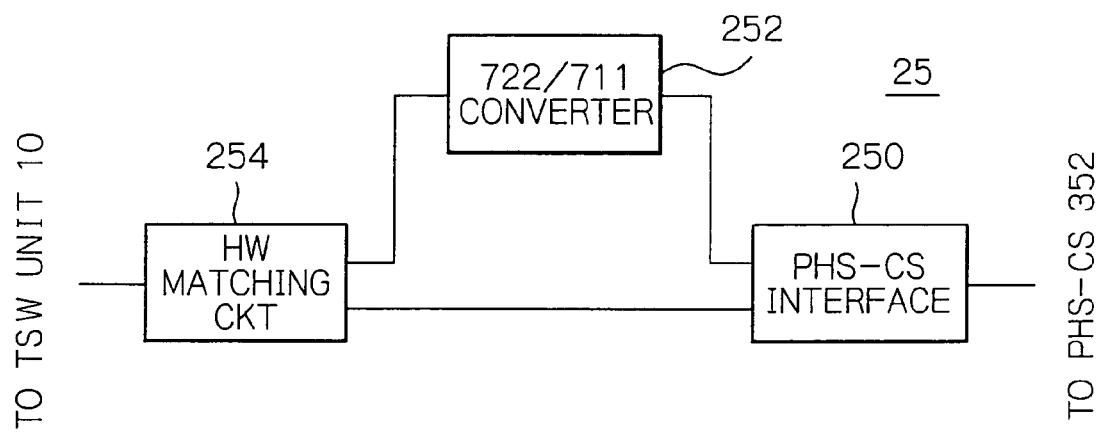
FIG. 4 is a schematic block diagram showing a specific configuration of still another line package also included in the illustrative embodiment but accommodating a PHS (Personal Handyphone System) cell station.

The line package 25, FIG. 1, has the appearance of a PHS cell station (PHS-CS) 352 that is, in turn, connectable to a PHS terminal 350 by radio waves. FIG. 4 shows a specific configuration of that line package or PHS-CS package 25. As shown, the line package 25 is generally made up of a PHS-CS interface 25A, a 722/711 converter 252, and a HW matching circuit 254. To a single PHS cell station 352, a plurality of line packages or PHS-CS packages 25 may be assigned, if desired. Alternatively, a single line package or PHS-CS package 25 may include two or more sets of PHS-CS interface circuit 250, 722/722 converter 252 and HW matching circuit 254 so as to deal with a plurality of PHS terminals 350 at the same time.

The 722/711 converter 252 and HW matching circuit 254 may be respectively configured in the same manner as the 722/711 converter 242 and HW matching circuit 244 shown in FIG. 3.

How the PHS-CS interface circuit 250 of the line package 25 interchanges data with the PHS cell station 352 will be described hereinafter. When the PHS terminal 350 is operated in its voice mode, the PHS-CS interface circuit 250 allots two time slots each being adaptive to 32 kbps to 64-kbps data that accords to the G.711 coding rule. The two time slots thus assigned to 64-kbps data may be two of the four time slots or channels included in a single TDMA (Time Division Multiple Access) frame or two time slots appearing at the same time position in two continuous TDMA frames. Not the PHS-CS interface circuit 250 but the PHS cell station 352 may be configured to match two time slots to 64 kbps data, if desired.

On the other hand, when the PHS terminal 350 is operated in its data communication mode, the PHS-CS interface circuit 250 plays the role of an IP packet assembler/disassembler and transmits and receives IP packets to and from the PHS cell station 352. More specifically, if the data communication mode available with the PHS terminal 350 is the 64-kbps mode, then the PHS-CS interface circuit 250 transmits and receives IP packets according to the 48-kbps mode or the 56-kbps mode of the G.722 coding rule to and from the PHS-CS 352. If the data communication mode available with the PHS terminal 350 is the 128-kbps mode, then the PHS-CS interface circuit 250 transmits and receives IP packets according to the 64-kbps mode of the G.722 coding rule to and from the PHS cell station 352.

A specific operation of the PBX 1 having the above configuration will be described hereinafter on the assumption that the broadband analog telephone set 33 is operated to originate a speech call directed to the central office line interconnected to the analog PSTN 30.

On detecting the off-hook of the broadband analog telephone set 33, the line package 23 having the appearance of the broadband analog telephone set 33, reports the off-hook to the central processor module 11. In response, the central processor module 11 causes an appropriate trunk, not shown, to generate and pass a tone indicative of the detection of off-hook through the line package 23. At the same time, the line package 23 takes in destination information, or central office line information, in the analog PSTN 30 output from the broadband analog telephone set 33, and delivers the destination information to the central processor module 11. In response, the central processor module 11 operates the time switch unit 10 in such a manner as to establish a path between the line packages 23 and 20.

When the path mentioned above is established, the line packages 23 and 20 negotiate with each other on the coding rule. For example, assume that the line package 23 outputs information showing that it executes processing based on the G.722 coding rule, and that the line package 20 outputs information showing that it executes processing based on the G.711 coding rule. If desired, the line package 20 not adaptive to broadband communication may be adapted not to output any particular information to the line package 23 to thereby indicate the G.711 coding rule available therewith. Such negotiation on the coding rule may be executed as exclusive processing for negotiation or in association with the report of call origination or that of an answer thereto. Further, for the negotiation, use may be made of a speech data field, as distinguished from a signaling data field, included in a frame to be transmitted and received.

In the above specific operation, despite that the line package 23 is adaptive to the G.722 coding rule, the line package 23 conditions its circuitry for the G.711 coding rule when the mating or other line package 20 is not adaptive to the G.722 coding rule. As a result, data are transmitted between the line packages 23 and 20 via the time switch unit 10 in accordance with the G.711 coding rule.

Another specific operation of the PBX 1 will be described on the assumption that a speech call meant for the broadband IP telephone set or destination 34 is originated on the broadband analog telephone set or source 33. Again, a path that connects the line packages 23 and 24 to each other is established in the time switch unit 10 in response to the off-hook of the broadband analog telephone set 33 and input of an extension number owned by the broadband IP telephone set 34. Subsequently, the line packages 23 and 24 negotiate with each other on the coding rule. For example, the line packages 23 and 24 both deliver information indicative of processing adaptive to the G.722 coding rule to each other.

In the above exemplified condition, the line packages 23 and 24 each condition respective circuitry for the G.722 coding rule. On the other hand, if the line packages 23 and 24 are different from each other in transmission rate mode, then the line packages 23 and 24 each may select a higher rate available. Alternatively, one of the line packages 23 and 24 located at the source side may select its own rate mode, i.e. 48-kbps mode, 56-kbps mode or 64-kbps mode, in which case the other line package located at the destination side will also select that transmission rate mode selected on the source side.

When the line packages 23 and 24 both are prepared for the G.722 coding rule, as stated above, the time switch unit 10 apparently passes therethrough frames with a form at matching to the G.711 coding rule. However, speech data inserted in those frames have been encoded by compression in accordance with the G.722 coding rule.

It should be noted that information indicative of the G.722 coding rule is reported by being inserted into an idle band in the 48-kbps mode or the 56-kbps mode, or into the lowest bit periodically stolen in the 64-kbps mode, as stated previously. Such information is inserted also during data transmission effected after the establishment of the coding rule.

The remaining line packages also transmit and receive data after negotiating a coding rule with each other and then conditioning respective circuitry for the coding rule to share.

As stated above, in the illustrative embodiment, any line package accommodating an apparatus adaptive to broadband communication is capable of negotiating a coding rule to use with another line package, accomplishing the in-channel negotiation of either one of the G.711 and G.722 coding rules. It is therefore possible to accommodate units adaptive to broadband communication without significantly modifying existing arrangements including software installed in the central processor module 11.

Further, the line packages are adapted such that, when a call is originated on a line package in accordance with the G.722 coding rule, the line package delivers to the time switch unit 10 information indicative of the G.722 coding rule to use and information indicative of a transmission rate mode included in the G.722 coding rule. The line packages can therefore surely report the G.722 coding rule to its mating line package connected thereto while minimizing sites to be affected by the reporting function.

While the illustrative embodiment described above is applied to a PBX, it may, of course, be implemented as any other telephone switching system, e.g. a central office switching system. Further, the broadband-adaptive devices included in the illustrative embodiment are only illustrative and may include a facsimile unit adaptive to the broadband IP protocol, in which case the facsimile unit will be interconnected to a line package operable in the same manner as, among the various line packages shown and described, the line package adaptive to IP packets.

The entire disclosure of Japanese patent application No. 2003-386949 filed on Nov. 17, 2003, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A telephone switching system comprising:
   a plurality of line packages; and
   a switch unit allowing a path to be established between ones of said plurality of line packages,
   wherein each of said plurality of line packages includes a broadband-adaptive line package interconnected to a broadband network or a broadband-adaptive apparatus and adaptive to both of a first voice coding rule expected of said switch unit with respect to input data and a second voice coding rule having a higher compression ratio for voice coding than the first voice coding rule,
   wherein said broadband-adaptive line package comprises a setting circuit for monitoring a voice coding rule of another of said plurality of line packages, which is connected to said broadband-adaptive line package via said switch unit, based on information received via said switch unit, and
   wherein if said another line package is adaptive only to the first voice coding rule, said setting circuit conditions circuitry of said broadband-adaptive line package for the first voice coding rule, and, if said another line package is adaptive to both of the first voice coding rule and the second voice coding rule, said setting circuit condition circuitry of said broadband-adaptive line package for the second voice coding rule.

2. The system in accordance with claim 1,
   wherein said broadband-adaptive line package further comprises a first voice coding rule information sender for sending out information indicative of adaptability of said broadband-adaptive line package to both of the first voice coding rule and the second voice coding rule, and
   wherein said first voice coding rule information sender inserts, if an idle band is available in a highway slot of said switch unit, the information into the idle band to send out the information.

3. The system in accordance with claim 1,
   wherein said broadband-adaptive line package further comprises a second voice coding rule information sender for sending out information indicative of adaptability of said broadband-adaptive line package to both of the first voice coding rule and the second voice coding rule, and
   wherein said second voice coding rule information sender periodically steals, if an idle band is not available in a highway slot of said switch unit, one bit located at a predetermined position on the highway slot and inserts the information into the predetermined position to send out the information.

4. The system in accordance with claim 3, wherein the information to be sent out is formed in a multi-frame pattern.

5. The system in accordance with claim 1, wherein said broadband-adaptive line package further comprises:
   a highway matching circuit for negotiating a voice coding rule with said another line package, and monitoring a voice coding rule pattern included in a signal received from said another line package;
   a first codec for selectively coding and decoding a speech signal in accordance with said first voice coding rule, which is International Telecommunication Union-Telecommunication standardization sector Recommendation G.711;
   a second codec for selectively coding and decoding a speech signal in accordance with said second voice coding rule, which is International Telecommunication Union-Telecommunication standardization sector Recommendation G.722; and
   an analog-to-digital/digital-to-analog converter for selectively converting an analog speech signal input from a broadband analog telephone set to a corresponding digital signal, or a digital speech signal input from said first codec or said second codec to a corresponding analog signal.

6. The system in accordance with claim 1, wherein said broadband-adaptive line package further comprises:
   a highway matching circuit for voice coding rule negotiation with said another line package, and monitoring a voice coding rule pattern included in a signal received from said another line package;
   a codec for including an International Telecommunication Union-Telecommunication standardization sector Recommendation G.711/G.722 codec for selectively coding and decoding a speech signal in accordance with voice coding rules, which include International Telecommunication Union-Telecommunication standardization sector Recommendations G.711 and G.722; and
   an IP packet assembler/disassembler for selectively disassembling IP (Internet Protocol) packets received from a broadband IP telephone set or assembling IP packets to be sent to the broadband IP telephone set.

7. The system in accordance with claim 1, wherein said broadband-adaptive line package further comprises:
   a highway matching circuit for voice coding rule negotiation with said another line package, and monitoring a voice coding rule pattern included in a signal received from said another line package;
   a codec for selectively coding and decoding a speech signal in accordance with voice coding rules, which include International Telecommunication Union-Telecommunication standardization sector Recommendations G.711 and G.722; and
   a PHS-cell station interface circuit for interchanging data with a PHS (Personal Handyphone System) cell station according to a voice mode or communication mode.

* * * * *